United States Patent [19]

Puillet

[11] Patent Number: 4,656,827
[45] Date of Patent: Apr. 14, 1987

[54] FUEL METERING SYSTEM FOR A GAS TURBINE ENGINE

[75] Inventor: Raymond Puillet, Lagny, France

[73] Assignee: Societe Nationale d'Etude et de Construction de Meteur d'Aviation-"S.N.E.C.M.A.", France

[21] Appl. No.: 788,588

[22] Filed: Oct. 17, 1985

[30] Foreign Application Priority Data

Oct. 17, 1984 [FR] France ............................ 84 15871

[51] Int. Cl.⁴ .............................................. F02C 9/26
[52] U.S. Cl. ..................................... 60/39.281; 60/734; 137/599
[58] Field of Search .................. 60/39.281, 734; 137/567, 599; 73/197, 232, 861.36, 861.77

[56] References Cited

U.S. PATENT DOCUMENTS

| | | | |
|---|---|---|---|
| 2,599,680 | 6/1952 | Weeks | 60/39.281 |
| 2,630,820 | 3/1953 | Gray | 73/197 |
| 2,640,423 | 6/1953 | Boyer | 60/39.281 |
| 2,936,028 | 5/1960 | Gatzemeyer et al. | |
| 2,989,842 | 6/1961 | Wood et al. | 60/39.281 |
| 3,738,104 | 6/1973 | Rosa | |
| 4,208,871 | 6/1980 | Riple, Jr. | |

FOREIGN PATENT DOCUMENTS

| | | |
|---|---|---|
| 2380585 | 2/1977 | France . |
| 327443 | 3/1958 | Switzerland . |
| 1483490 | 8/1977 | United Kingdom . |

*Primary Examiner*—Louis J. Casaregola
*Attorney, Agent, or Firm*—Bacon & Thomas

[57] ABSTRACT

A fuel metering system for a gas turbine engine is disclosed which includes two rotating flowmeters connected to the fuel supply circuit in parallel. The speed of the flowmeters are controlled by a pair of braking motors and tachometers are provided in each to provide an output signal of their rotational speeds. A control circuit is connected to the system to regulate the speed of the flowmeters to insure that the total fuel flow coincides with a reference value. Should a malfunction occur in one of the flowmeter systems, the control circuit may regulate the speed of the remaining flowmeter to retain the total fuel flow at the reference value.

11 Claims, 3 Drawing Figures

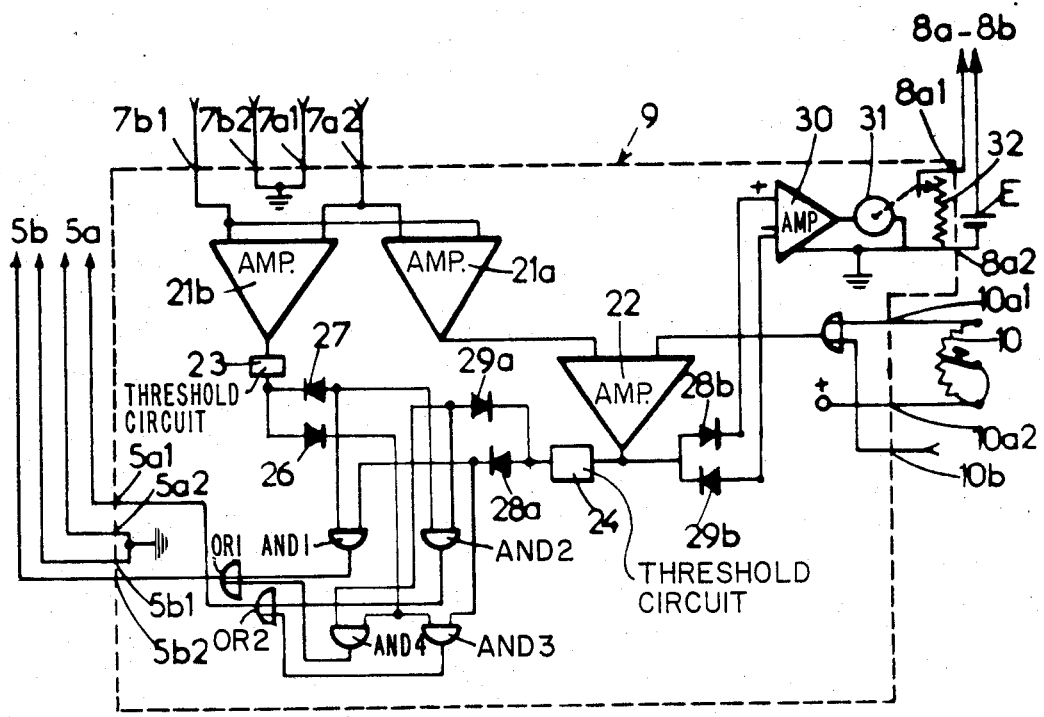
FIG.: 2
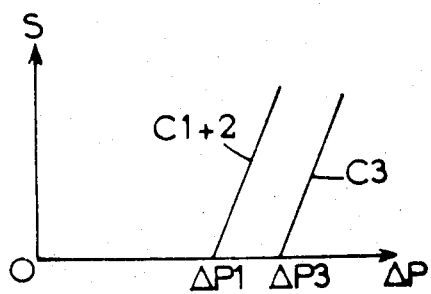
FIG.: 3

FUEL METERING SYSTEM FOR A GAS TURBINE ENGINE

FIELD OF THE INVENTION

The present invention relates to a fuel metering system for a gas turbine engine, particularly such a system having increased reliability.

BRIEF DESCRIPTION OF THE PRIOR ART

Many systems are known for controlling the supply of fuel for gas turbine and other types of engines. The typical prior art system for gas turbine engines include at least one rotating flowmeter and some means for constraining its rotational speed to a reference value of fuel flow.

French Pat. No. 2,380,585 shows, in FIG. 1, a fuel regulating device having a rotating flowmeter coupled to an electric stepping motor which, in turn, is connected to a frequency synthesizer. The stepping motor applies a braking torque to the rotating flowmeter, the magnitude of which depends upon the reference value, or set point, for the flow through the flowmeter. Due to the braking of the flowmeter, a drop in pressure occurs between the inlet and the outlet, which results in internal leaks which, in turn, affect the accuracy of the fuel metering. In an attempt to obviate this problem, the same French patent, in FIG. 5, includes a second flowmeter coupled in series downstream of the first flowmeter which is designed to generate a reaction signal which is fed to the control circuit of the braking motor. Such a system is costly, bulky and has comparatively low reliability which, as a practical matter, excludes its consideration from the systems required to meter fuel of a gas turbine aircraft engine.

U.S. Pat. No. 4,208,871 to Riple, Jr., also discloses a fuel control system. This system utilizes a positive displacement pump as a flowmeter and drives the metering pump by a variable speed electric motor having an electronic control circuit which considers various engine parameters to determine the flow reference value. A pressure regulating device is mounted between the inlet and the outlet of the positive displacement metering pump in such a manner that the pressure drop across the metering pump is kept substantially constant.

U.S. Pat. No. 3,738,104 to Rosa describes a gas turbine fuel flow metering system which includes a rotating flowmeter and two tachometers which generate output signals. These output signals together with a flow control signal accommodate the various turbine operational parameters and adjust a servo valve inserted into a shunt circuit of the fuel flow feed to the flowmeter. In this system, the flowmeter is devoid of any metering or control function, this function being assumed by the complex assembly of tachometers, electronics and servo valves.

British Pat. No. 1,483,490 describes a fuel control system for a gas turbine engine which includes a centrifugal pump in series with a positive displacement pump. The positive displacement pump, which is illustrated as being of the vane type, is driven by an electric motor which has its speed regulated by an electronic circuit as a function of the various parameters of the turbine engine. If the centrifugal pump rotates at a sufficiently high speed, the positive displacement pump operates as a flow control flowmeter, with a constant pressure drop being maintained by a regulating valve located between the intake and the outlet of the flowmeter.

SUMMARY OF THE INVENTION

The present invention provides a fuel metering system which eliminates the malfunctions which may affect the operation of such devices in order to increase the reliability and accuracy of the system. The system according to the invention includes two rotating flowmeters connected in parallel to a fuel supply line and a fuel outlet line, a tachometer and a torque generator respectively coupled to each of the flowmeters. The invention also includes a control circuit which receives inputs from the two tachometers and a reference value for the desired total fuel flow. The control circuit feeds a deviation signal in parallel to each of the two torque generators, this deviation signal depending upon the sum of the speeds of rotation of the two flowmeters.

The advantages offered by the fuel control device of the present invention with two rotating flow members connected in parallel are not restricted to those advantages which would ensue from merely doubling the generally fragile, high-precision components, such as the flowmeters. The well known redundancy principle applied to a fuel control system would merely consist in keeping one of the two flowmeters in the circuit and the other idle until a malfunction affects the operation of the first flowmeter. The system would then switch to the second flowmeter and take the first malfunctioning flowmeter out of the system.

In the present invention, the two flowmeters operate in parallel under normal conditions and, should a malfunction occur which affects a flowmeter's accuracy, the second flowmeter would then compensate for the malfunctioning flowmeter and retain the total fuel flow at its reference value. Obviously, if the malfunction is severe, then the malfunctioning flowmeter will be shut down completely and, as in the case of a redundant system, the second flowmeter will assume complete control of the fuel flow.

The torque generators associated with each of the flowmeters, as is known in the art, can be either adjustable speed motors which generate drive and acceleration torques, or they can be braking motors, which generate braking torques. In both cases, means may be provided to regulate the pressure differential between the upstream and downstream pressures of the rotating flowmeters to a substantially zero value (where torque motors are utilized) or to a substantially constant, low value (where braking motors are utilized).

In a preferred embodiment of the invention, a check valve is mounted at the intake of each flowmeter and is connected to the control circuits such that, in the event that the speed of one of the flowmeters exceeds that of the other by a substantial amount, the check valve of the faster flowmeter will be closed if the total fuel flow substantially exceeds the reference value. Conversely, the check valve associated with the other flowmeter will be closed if the total fuel flow is substantially less than the reference value.

The elimination of one of the flowmeters from the fuel supply circuit is accomplished only when the total fuel flow ($D = D1 + D2$) from the two flowmeters substantially differs from its reference value Dr. The elimination of one of the flowmeters also depends upon the difference in speeds ($n1 - n2$) between the first and second flowmeters being substantially larger or substantially less than zero. If n1 is much larger than n2, and if D is much larger than Dr, it is indicative of a malfunction in the brake associated with the first flowmeter, which then must be removed from the fuel flow circuit by closing the check valve. On the other hand, with the same difference in rotational speeds, if D is much less than Dr, it is indicative of a malfunction in the signal output from the tachometer associated with the second flowmeter, which requires that the second flowmeter be removed from the fuel flow circuit.

When rotating flowmeters utilized with the present invention are volumeters of a known type, the means for regulating the pressure differential between the upstream and downstream pressures of the flowmeters may include a regulating valve connected in parallel with a common intake of the two flowmeters, and a differential-pressure sensor which controls the position of this regulating valve.

In a preferred embodiment, the means regulating the pressure differential includes a second regulator valve mounted in series with the first regulating valve, and a third regulating valve which is mounted in parallel with the first and second valves. Thus, if either of the first or second regulating valves are jammed in position when open, the other valve in series assumes the regulation of the pressure differential. If, on the other hand, either of the first or second regulating valves is jammed in the closed position, the normally closed, third regulating valve opens and assures the regulation of the pressure differential.

The system according to the invention minimizes the internal leaks of the flowmeters which might affect their accuracy by maintaining the pressure differential across the flowmeters at a very low or zero value.

BRIEF DESCRIPTION OF THE DRAWINGS

FIG. 2 is an electrical schematic diagram showing the control circuit utilized in the system according to the invention.

FIG. 3 is a graph of the pressure differential versus regulating valve position.

DETAILED DESCRIPTION OF THE PREFERRED EMBODIMENT

Figure 1:
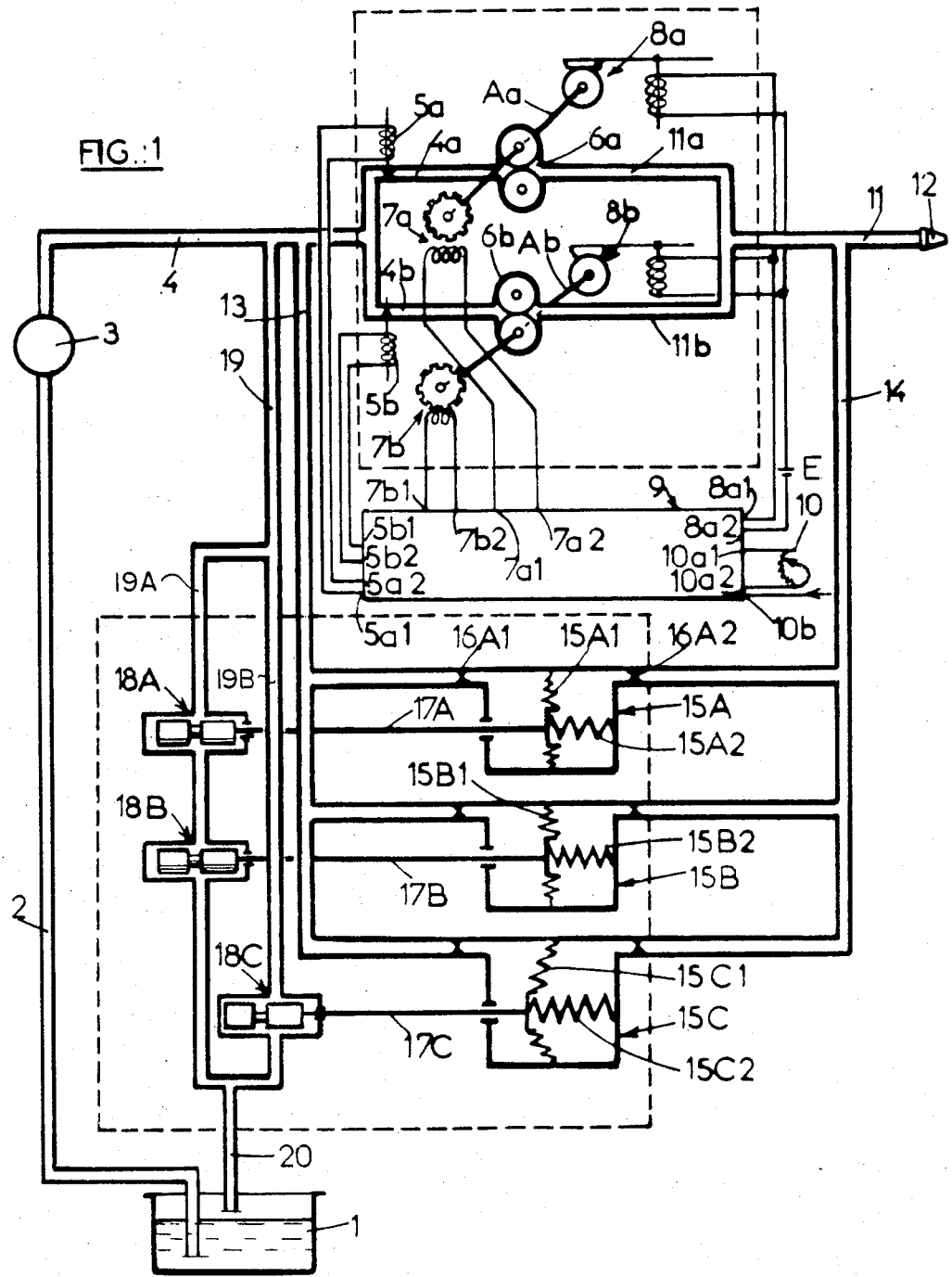
FIG. 1 is a schematic diagram illustrating the flowmetering system according to the present invention.

FIG. 1 shows a fuel tank 1 having a suction tube 2 connected to a fuel pump 3. The outlet of fuel pump 3 is connected to fuel supply line 4 which is divided into fuel lines 4a and 4b. Fuel lines 4a and 4b are connected to rotating flowmeters 6a and 6b, respectively, and electrically actuated check-valves 5a and 5b are located in lines 4a and 4b upstream of the flowmeters. The flowmeters 6a and 6b are identical and may be of the positive displacement type, such as a gear, piston or vane pump. The shafts Aa and Ab of each flowmeter 6a and 6b are drivingly connected to the rotor of a tachometer 7a and 7b and to the rotor of an electric braking motor 8a and 8b. The tachometers 7a and 7b are identical and may be of any known type, such as tacho-generators having an electromotive force across the stator windings which is proportional to the rotational speed of the corresponding positive displacement flowmeters and, consequently, to the flow of fuel through them. As shown in FIG. 1, the stator windings of the tacho-generators 7a and 7b are connected respectively to inputs 7a1, 7a2 and 7b1, 7b2 of electronic control circuit means 9, diagrammatically illustrated in FIG. 1. A specific electronic design for this control circuit is shown in detail in FIG. 2.

Control circuit 9 also includes inputs 10a1 and 10a2 which are connected to a display means for establishing the set point for reference value of the fuel flow. This display means may be controlled manually, such as by rheostat 10. Control circuit 9 further has an input 10b for one or more signals from sensors which sense the various gas turbine operational parameters that must affect the reference value of the fuel flow. Control circuit 9 also includes two pairs of output 5a1, 5a2 and 5b1, 5b2 which are respectively connected to the control windings of the valves 5a and 5b. Outputs 8a1, 8a2 are connected in parallel to the stator windings of the braking motors 8a and 8b, respectively.

Outlet conduits 11a and 11b are each connected to flowmeters 6a and 6b, and converge into a single fuel outlet line 11 which feeds fuel to an engine injector 12 or a set of such injectors in the gas turbine engine.

A pair of pressure conduit means 13 and 14 are connected to fuel supply and outlet lines 4 and 11, respectively. Conduit 13 is connected to fuel supply line 4 upstream of its bifurcation into lines 4a and 4b, while conduit 14 is connected to fuel outlet line 11 downstream of the convergence of conduits 11a and 11b. The conduits 13 and 14 are connected to pressure differential actuators 15A, 15B and 15C. The pressure differential actuators are illustrated as being of the membrane type and each has a membrane (15A1, 15B1 and 15C1) engaged by springs 15A2, 15B2 and 15C2, respectively. Flow restrictors 16A1 and 16A2 may be located at the intake connections of the pressure differential actuators 15A–15C. Rods 17A, 17B and 17C serve to connect the respective membranes of each of the actuators to regulating valves 18A, 18B and 18C, respectively. As shown in FIG. 1, first and second regulating valves 18A and 18B are located in series with each other in a bypass line 19. Bypass line 19 is divided into two parallel bypass conduits, 19a and 19b, respectively. The third regulating valve 18C is located in parallel with the first two regulating valves and is located in bypass conduit 19b. The bypass conduits converge into a common discharge line 20 which returns unused fuel to the fuel source 1.

FIG. 3 is a plot of the pressure regulation properties of the three regulators 15A–18A, 15B–18B and 15C–18C, respectively. The pressure differential Δp between the pressure upstream of the positive displacement flowmeters 6a and 6b (that prevailing in conduits 4, 13 and 19) and the pressure downstream of the flowmeters 6a and 6b (that prevailing in conduits 11 and 14) is plotted as the abscissa and the open cross-section S of one of the regulating valves is plotted as the ordinate. The curve C1+2 is a steeply sloping straight line and corresponds to the pressure regulating properties of the first two regulators 15A–18A and 15B–18B. The curve C3 is also a straight line substantially parallel to that of C1+2, but located at a higher value of Δp and represents the pressure regulating properties of the third regulating valve system 15C–18C.

When the two identical positive displacement flowmeters 6a and 6b are operating normally, the fuel flow moved by the pump 3 into the fuel supply line 4 is split into equal fractions which pass into the two flowmeters 6a and 6b through the open check valves 5a and 5b. The control circuit 9 receives at its inputs 7a1, 7a2 and 7b1, 7b2 essentially equal potentials which it adds and then multiplies by a constant to arrive at the total flow through the two flowmeters. The control circuit 9 then compares this total flow with the reference value received at inputs 10a1, 10a2 and the signals arriving at input 10b from the engine. If the total flow D determined by the control circuit 9 exceeds the numerical reference value Dr, the control circuit 9 will transmit a deviation potential proportional to the difference (D−Dr) to outputs 8a1, 8a2. Since the outputs are connected to the stator windings of braking motors 8a and 8b, these motors apply braking torques to the shafts Aa and Ab of the two flowmeters to reduce their respective speeds of rotation. This reduces the total flow through the flowmeters and continues it until this flow reaches the reference value Dr. At this time, the deviation potential applied to the output 8a1 and 8a2 stabilizes and the braking motors 8a and 8b apply a constant braking torque to the flowmeters.

In the normal operation described above, the two flowmeters 6a and 6b operate as motors and the downstream excess pressure $\Delta p$ kept constant and preferably at a low value by the three pressure differential regulators 15A-18A. This limit on the upstream excess pressure allows the restricting of the rotational speed of each of the flowmeters 6a and 6b and, consequently, the power required for the braking motors 8a and 8b. In order to limit the flowmeters to very small flows, it is necessary that the braking motors 8a and 8b be capable of power outputs which, at their maximum, are substantially as high as the powers of the displacement flowmeters operating as motors, such powers depending on $\Delta p$. Also, by restricting the $\Delta p$ to a low value, the presence of internal leaks in the flowmeters 6a and 6b is minimized which serves to increase their accuracy when measuring and metering the fuel flow.

As the two flowmeters 6a and 6b normally operate under the same conditions, any change in the speed of rotation of one of them would also apply to the total flow D and its computed value in the control circuit 9 when that flow drops below the reference value Dr. Assuming that flowmeter 6a slowed its rotational speed, the deviation potential becomes negative and is applied from outputs 8a1 and 8a2 of the control circuit 9 in parallel to the stator windings of the braking motors 8a and 8b. The control signals decreases the braking torque generated by the braking motors to thereby accelerate flowmeters 6a and 6b. If the cause for the decrease in the speed of flowmeters 6a is such as to restrict its speed to such a low value regardless of the braking torque applied to it, only the flowmeter 6b will accelerate due to the reduction in braking torque applied to it. The acceleration of flowmeter 6b will cease only when the computed flow value in the control circuit 9 approximates the reference value Dr.

If one of the two flowmeters (for instance, flowmeter 6a) stops rotating due to a mechanical malfunction, thereby dropping the speed measured by tachometer 7a to zero, control circuit 9 applies a drive potential to the outputs 5a1, 5a2 so as to close the valve 5a associated with the malfunctioning flowmeter 6a. Upon this occurrence, flowmeter 6b will be accelerated by the reduction in torque generated by braking motor 8b until it reaches a speed such that the flow D through conduit 11 approximates the reference value Dr. This presupposes that each of the flowmeters 6a and 6b has a capacity equal to the maximum reference value of the injectors 12.

If either of the regulating valves 18A or 18B, located in series with each other, happens to become jammed in the open position, then the other, non-jammed regulating valve will assume the regulation of $\Delta p$ for values of $\Delta p$ at least equal to or slightly above $\Delta p1$ (see FIG. 3). However, if one of the first or second regulating valves 18A or 18B becomes jammed in the closed position, then the third regulating valve 18C (which is normally closed) opens and assumes the regulation of $\Delta p$ for values at least equal to and generally slightly above $\Delta p3$ (see FIG. 3). In all cases, the pressure differential $\Delta p$ is regulated to a value equal to or slightly above $\Delta p1$ and the regulation interval can easily be reduced. The regulation interval for $\Delta p$ depends on the spring constant of the springs 15A2, 15B2 and 15C2 and on the compliance of the membranes 15A1, 15B1 and 15C1. Flow restrictors 16A1 and 16A2 may be utilized to limit the pressures within the pressure differential actuators and to minimize the problems due to a substantial leak across the membranes.

A specific embodiment of the control circuit 9 is shown in FIG. 2. In the embodiment illustrated, the various inputs of the regulation control circuit 9 receive, and its various outputs generate analog electrical potentials which as a rule are DC. However, some or all of the components shown schematically in FIG. 2 may operate digitally. The latter possibility is compatible with the employment in the system shown in FIG. 1 of electrical components which generate, or are controlled by analog signals, provided that there be analog-digital converters at the inputs of the control circuit 9 and digital-analog converters at its outputs. These converters may be eliminated if the devices controlled by the control circuit are capable of generating or of being controlled by digital signals, such as by analog-digital or digital-analog converters associated with each of the different components. The design and operation of the control circuit 9 will be described without reference to the digital or analog nature of the processed signals.

As shown in FIG. 2, operational amplifiers 21a and 21b receive the signals corresponding to the speeds $n_a$ and $n_b$ of the flowmeters 6a and 6b, with amplifier 21a adding and multiplying by a constant K such that $K(n_a+n_b)=D$ which is the total flow of the flowmeters 6a and 6b. Operational amplifier 21b on the other hand subtracts the speeds $(n_a-n_b)$. Operational amplifier 22 receives at one of its inputs the value D from amplifier 21a and at its other input the reference value Dr from the display 10 modulated by the parameters of the input 10b. The output potentials of the operational amplifiers 21b and 22 are respectively proportional to $(n_a-n_b)$ and (D−Dr), and are applied to the threshold circuits 23 and 24 which produce an output with the same potential polarity as the input only when the voltages apply to their inputs exceed the predetermined threshold level. The output potentials of the threshold circuits 23 and 24 are transmitted as a function of their polarity, for instance by means of opposite polarity diodes 26, 27, 28a and 29a, and are applied to the inputs of the AND type logic circuits denoted by AND1 through AND4. The output signals of the logic circuits AND1 and AND4 are fed in parallel by means of an OR circuit denoted by OR1, to the output 5b2 of the circuit 9. Similarly, the outputs of the logic circuits AND2 and AND3 are fed in parallel to an OR2 logic circuit to the output 5a1 of the control circuit 9. The remaining outputs 5a2 and 5b1 are illustrated as being grounded.

The output potential from operational amplifier 22, which is proportional to (D−Dr) passes through opposite polarity diodes 28b and 29b to either of the two inputs, one polarized for plus, the other for minus, of operational amplifier 30. The output of this operational amplifier 30 drives a servomotor 31 which is coupled to the wiper of a potentiometer 32. One of the ends of the potentiometer 32 is connected to output $8a2$ of the control circuit 9 and its variable arm to output $8a1$. A DC power source E is connected across the output $8a2$ of the control circuit and the parallel stator windings of braking motors $8a$ and $8b$. The level of the power source E is selected in such a manner that the maximum torque generated by each of the braking motors $8a$ and $8b$ when the potentiometer 32 is at its minimum corresponds to the stoppage of each of the flowmeters $5a$ and $5b$ and, consequently, to the total flow being approximately zero.

When the output potential from operational amplifier 22, which is proportional to $(D-Dr)$, is positive or negative, it passes through the diode $28b$ or the diode $29b$ to the plus or minus input of the operational amplifier 30. The output of amplifier 30 has a DC potential, either positive or negative, with an amplitude substantially proportional to the difference $(D-Dr)$. Depending upon the polarity, the potential causes the servomotor 31 to rotate either in the direction of increasing the variable resistance of the potentiometer 32 or in the direction of decreasing the resistance of the potentiometer, as a result of which there will be a decrease or an increase in the supply potential E applied in parallel to the stator windings of braking motor $8a$ and $8b$. Accordingly, there is a reduction or an increase of the braking torques applied to the flowmeters $6a$ and $6b$ and, therefore, there is an increase or decrease of the total flow D until $D=Dr$. At that point, the output potential of operational amplifier becomes null and the servomotor 31 stops.

If the speed of one of the flowmeters (for instance speed $n_a$ of flowmeter $6a$) becomes much higher than the speed of the other flowmeter, the positive potential at the output of threshold circuit 23 passes through the diode 26 to the first inputs of the two AND3 and AND4 logic circuits. If, at the same time or shortly thereafter, the total flow D substantially exceeds the reference value Dr, then the positive potential at the output of the threshold circuit 24 passes through the diode $28a$ to the second input of the AND3 circuit. The output of this circuit then applies a control voltage to valve $5a$ in such a manner that this valve closes to thereby isolate the flowmeter $6a$. The increase in speed of this flowmeter can be caused by a malfunction of the corresponding brake motor $8a$. If, however, the output potential of threshold circuit 24 is negative, i.e., the total flow D is substantially less than the reference value Dr, this negative potential is fed to the second input of the AND4 circuit. The output of this circuit then applies a control potential to close the valve $5b$ such that the lower speed $6b$ will be removed from the fuel supply circuit. This latter occurrence of a substantial reduction in the value of the total flow D computed by the operational amplifier $21a$ indicates in this instance an excessive attenuation of the signal from the tachometer $7b$ to the inputs $7b1$ and $7b2$ of the control circuit 9. This attenuation could be caused by a short in the corresponding transmission line or in a malfunction of the tachometer itself. Since the speed of flowmeter $6b$ can no longer be accurately transmitted to the control circuit 9, this flowmeter is isolated from the fuel supply system.

If the speed of flowmeter $6b$ were to substantially exceed that of flowmeter $6a$, then the valve associated with flowmeter $6b$ would be closed, since the total flow D is much larger than the reference value Dr. The check valve associated with the other flowmeter $6a$ would be closed if the total flow D were much less than the reference value Dr. This would follow from similar reasonings involving the AND1 and the AND2 circuits.

The foregoing description is provided for illustrative purposes only and should not be construed as in any way limiting this invention, the scope of which is defined solely by the appended claims. The number of regulating valves 15A–18A through 15C–18C is optional and it is possible that only one such regulator need be provided. Similarly, flow restrictors 16A1 and 16A2 are also optional, and the design of the regulating valves 18A and the differential pressure sensors are matters of choice. Regulating valves 18A, 18B and 18C are advantageously located in parallel with the fuel supply pump 3, if this pump is a positive displacement type pump. The regulating valves may be arranged differently for other types of fuel supply pumps.

Also, the electronic control circuit 9 may be replaced by an equivalent circuit which operates entirely or in part by hydraulic or pneumatic actuation. The braking motors $8a$ and $8b$ may be replaced by other known types of braking means, in particular electromagnetic brakes operating on the magnetic powder principle or by eddy currents. Again, hydraulically or pneumatically controlled brakes may also be utilized without exceeding the scope of this invention.

It is also possible to replace the braking motors $8a$ and $8b$ by electric motors which are powered as the braking motors of FIG. 1. In that instance, the regulators of the pressure difference $\Delta p$ should be regulated such that the pressure differential $\Delta p$ always be close to the null value. The tachogenerators $7a$ and $7b$ may also be replaced by other known speed sensing devices.

What is claimed is:

1. A fuel metering system for a gas turbine engine having a fuel supply line emanating from a fuel source, the system comprising:
    (a) first and second rotating flowmeters;
    (b) inlet conduit means connecting inlets of the first and second flowmeters in parallel to the fuel supply line;
    (c) outlet conduit means connecting outlets of the first and second flowmeters in parallel to a fuel outlet line;
    (d) first and second torque generators rotatably coupled to the first and second flowmeters, respectively;
    (e) first and second tachometer means drivingly coupled to the first and second flowmeters, respectively, so as to rotate therewith, each of the first and second tachometer means producing an output signal proportional to its rotational speed;
    (f) means for generating a reference signal for the desired value of total fuel flow through the fuel outlet line; and,
    (g) control circuit means connected to the reference signal generating means, the outputs of the first and second tachometer means and the first and second torque generators so as to control the first and second torque generators such that the total fuel flow through the fuel outlet line remains approximately at the desired value.

2. The fuel metering system according to claim 1 wherein the first and second torque generators are braking motors and further comprising regulating means associated with the system such that fuel pressure differential between the inlet conduit means and the outlet conduit means is substantially constant.

3. The fuel metering system according to claim 1 further comprising:
   (a) first shut-off valve means located upstream of the first flowmeter so as to control the flow of fuel passing through the first flowmeter;
   (b) second shut off valve means located upstream of the second flowmeter so as to control the flow of fuel passing through the second flowmeter; and,
   (c) first and second valve control means connected to the first and second shut-off valve means, respectively, and to the control circuit means such that a shut-off valve will close if the rotational speed of its associated flowmeter substantially exceeds the rotational speed of the other flowmeter, or if the fuel flow through its flowmeter is substantially less than the desired value.

4. The fuel metering system according to claim 1 wherein the flowmeters are the positive displacement type.

5. The fuel metering system according to claim 4 further comprising:
   (a) a bypass line connected to the fuel supply line upstream of the first and second flowmeters and to the fuel source;
   (b) at least one valve in the bypass line to control the flow of fuel through the bypass line;
   (c) at least one pressure differential valve actuator connected to the valve; and,
   (d) pressure conduit means connecting the pressure differential valve actuator to the fuel supply line and to the fuel outlet line such that position of the valve is varied to control the fuel flowing through the bypass line by the fuel pressure differential across the first and second flowmeters.

6. The fuel metering system according to claim 5 wherein the bypass line comprises first and second bypass conduits connected in parallel between the fuel inlet line and the fuel source and further comprising:
   (a) a first valve in the first bypass conduit;
   (b) a second valve in the first bypass conduit in series with the first valve;
   (c) a third valve in the second bypass conduit;
   (d) first, second and third pressure differential valve actuators connected to the first, second and third valves, respectively; and,
   (e) pressure conduit means connecting the pressure differential valve actuators in parallel to the fuel supply line and the fuel outlet line.

7. The fuel metering system according to claim 6 wherein the third valve is normally closed.

8. The fuel metering system according to claim 7 wherein the pressure differential required to actuate the third pressure differential valve actuator is greater than the pressure differential required to actuate the first and second pressure differential valve actuators.

9. The fuel metering system according to claim 8 further comprising flow restricting means mounted in the pressure conduit means for each pressure differential valve actuator.

10. The fuel metering system according to claim 6 wherein the first and second torque generators are braking motors and further comprising regulating means associated with the system such that fuel pressure differential between the inlet conduit means and the outlet conduit means is substantially constant.

11. The fuel metering system according to claim 10 further comprising:
   (a) first shut-off valve means located upstream of the first flowmeter so as to control the flow of fuel passing through the first flowmeter;
   (b) second shut-off valve means located upstream of the second flowmeter so as to control the flow of fuel passing through the second flowmeter; and,
   (c) first and second valve control means connected to the first and second shut-off valve means, respectively, and to the control circuit means such that a shut-off valve will close if the rotational speed of its associated flowmeter substantially exceeds the rotational speed of the other flowmeter, or if the fuel flow through its flowmeter is substantially less than the desired value.

* * * * *

UNITED STATES PATENT AND TRADEMARK OFFICE
CERTIFICATE OF CORRECTION

PATENT NO. : 4,656,827

DATED : April 14, 1987

INVENTOR(S) : PUILLET

It is certified that error appears in the above—identified patent and that said Letters Patent is hereby corrected as shown below:

Col. 5, line 19, "$\Delta$ p kept" should be -- $\Delta$ p is kept--.

Signed and Sealed this

Second Day of February, 1988

Attest:

DONALD J. QUIGG

Attesting Officer

Commissioner of Patents and Trademarks